United States Patent [19]

Davis et al.

[11] Patent Number: 4,560,741

[45] Date of Patent: Dec. 24, 1985

[54] POLYESTER RESINS CAPABLE OF FORMING CONTAINERS HAVING IMPROVED GAS BARRIER PROPERTIES

[75] Inventors: Burns Davis; Robert B. Barbee, both of Kingsport, Tenn.

[73] Assignee: Eastman Kodak Company, Rochester, N.Y.

[21] Appl. No.: 722,577

[22] Filed: Apr. 12, 1985

[51] Int. Cl.$^4$ ............................................. C08G 63/16
[52] U.S. Cl. .................................... 528/302; 264/513; 428/35; 528/303; 528/308
[58] Field of Search ....................... 528/302, 303, 308; 428/35; 264/513

[56] References Cited

U.S. PATENT DOCUMENTS

| | | | |
|---|---|---|---|
| 4,340,721 | 7/1982 | Bonnebat et al. | 528/302 X |
| 4,403,090 | 9/1983 | Smith | 528/302 X |
| 4,415,727 | 11/1983 | Toga et al. | 528/302 X |
| 4,436,895 | 3/1984 | Barbee et al. | 528/302 X |
| 4,481,353 | 11/1984 | Nyilas et al. | 528/302 X |

*Primary Examiner*—Lucille M. Phynes
*Attorney, Agent, or Firm*—Clyde L. Tootle; J. Frederick Thomsen

[57] ABSTRACT

The present invention provides polyester resins useful for forming containers having improved resistance to gas permeability. The containers are formed from a polyester resin which comprises the reaction product of a diol containing up to about 8 carbon atoms and a diacid component which comprises about 5 to 95 mole percent of oxydiacetic acid, and about 5 to about 95 mole percent of naphthalene dicarboxylic acid. The polyester resin has an inherent viscosity of about 0.5 to 1.5. The containers which are provided by the present invention may be in the form of sheet, film, molded articles, such as bottles, and other such structures.

10 Claims, No Drawings

POLYESTER RESINS CAPABLE OF FORMING CONTAINERS HAVING IMPROVED GAS BARRIER PROPERTIES

DESCRIPTION

The present invention relates to polyester resins useful for forming packages for protecting comestibles. More specifically, it relates to polyester resins for forming films and molded containers which have improved gas barrier properties.

Presently there is a strong interest in the packaging industry for protecting comestibles (such as foodstuffs, medicines, and especially carbonated beverages) by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While molded containers formed from polyethylene terephthalate have, as indicated, many desirable characteristics, there is a need in the art to provide improved polyester containers which will have gas permeabilities which are lower than those of containers formed from polyethylene terephthalate homopolymers. Such improved containers would be much more versatile in their utilization and allow the containers to be used to package substances for which the polyethylene terephthalate containers may not be suitable.

Another patent, U.S. Pat. No. 3,991,035, discloses the preparation of filaments of a linear glycol terephthalic polyester to reduce pilling. The process comprises modifying the polyester by incorporating therein units which may be derived from iminodiacetic acid and thiodiacetic acid. A comparative example also discloses polyesters which incorporate 2.5-mole percent oxidacetic acid. Moreover, such polyesters can even be formed into sheet, film, or molded articles having improved gas barrier properties as noted in U.S. Pat. No. 4,436,895. However, the polyester resins which contain at least 5 mole percent oxydiacetic acid provide sheet, film or molded articles having substantially improved gas barrier properties which make containers formed from these or related compositions useful in the packaging industry. Moreover, copolyester compositions which contain naphthalene dicarboxylic acid in place of terephthalic acid provide polymeric compositions which can be formed, for example by blow molding operations, into containers which have even better structural strength properties and gas barrier properties. Such polyester resins, and containers formed therefrom, therefore, would be an advance in the state of the art.

In accordance with the present invention, it has been found that containers formed from a polyester resin comprising the reaction product of a diol containing up to about 8 carbon atoms with about 5 to 95 mole percent of oxydiacetic acid, and about 5 to about 95 mole percent of naphthalene dicarboxylic acid has good strength and barrier properties. The polyester exhibits an inherent viscosity of about 0.5 to 1.5.

These polyester resins can be formed into containers having improved resistance to gas permeability. As used herein, the term "container" is intended to mean shaped articles formed from the specified polyester which are suitable for use in packaging comestibles. Such shaped articles include not only sheets and films which are extruded from the polyester and which may be used as such or as barrier layers, container liners, as components of laminates or other composites, and the like, but also articles which include blow molded containers, such as bottles.

The polyester of the present invention comprises the reaction product of a diol component and a diacid component. The diol component comprises one or more diols containing up to about 8 carbon atoms. Examples of such diols include ethylene glycol; 1,4-butanediol; 1,4-cyclohexanedimethanol; propylene glycol; diethylene glycol; 2,2,4-trimethyl-1,3-pentanediol; 2,2-dimethyl-1,3-propanediol; 2,2-diethyl-1,3-propanediol; 2-methyl-2-propyl-1,3-propanediol; 1,3-butanediol; 1,5-pentanediol; 1,6-hexanediol; 1,2-cyclohexanedimethanol; 1,3-cyclohexanedimethanol; 2,2,4,4-tetramethyl-1,3-cyclobutanediol; o-, m-, and p-xylylene diols; etc. The diol component is preferably selected from ethylene glycol, 1,4-butanediol, and 1,4-cyclohexanedimethanol, and is more preferably selected from ethylene glycol and 1,4-butanediol. Most preferably, the diol component comprises ethylene glycol. Additionally, minor amounts (i.e., less than about 50 mole percent, and, preferably, less than about 10 mole percent, based on the total amount of diol present in the polyester) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3-propanediol; 2,2,4-trimethyl-1,6-hexanediol; 4,4'-sulfonyldiphenol; 4,4'-oxydiphenol; 4,4'-isopropylidenediphenol; 2,5-naphthalenediol; and other well known polyester-forming diols.

The polyester resin further comprises a diacid component. The diacid component comprises diacetic acid and a naphthalene dicarboxylic acid. The naphthalene dicarboxylic acid can be a naphthalene dicarboxylic acid such as, for example, preferably the 2,6-naphthalene dicarboxylic acid and 2,7-naphthalene dicarboxylic acid. Other well-known polyester-forming diacids may be employed in minor amounts. Such diacid components may include, for example, isophthalic acid, 1,4-cyclohexanedicarboxylic acid, linear lower alkyl dicarboxylic acids, etc. The diacid component can also be the ester-forming derivatives of the diacids. Examples of such ester-forming derivatives are the anhydrides, esters, particularly the lower alkyl ($C_1$–$C_4$) esters, and acid chlorides of such diacid components and polyester forming acids mentioned.

The oxydiacetic acid is present in the polyester in a concentration of about 5 to 95 mole percent, based upon the total amount of diacid present in the polyester. The polyester further comprises 5 to about 95 mole percent of naphthalene dicarboxylic acid.

When the polyester is to be formed into a sheet or film, the oxydiacetic acid is preferably present in an amount of at least about 15 mole percent and, more preferably, in an amount of at least about 30 mole percent (i.e., about 30 to 95 mole percent). When a molded container, such as a bottle, is desired, the oxydiacetic acid is preferably present in an amount of about 5 to 20 mole percent and, more preferably, is present in an amount of about 10 to 20 mole percent.

The polyester which is employed in the present invention exhibits an I.V. of about 0.5 to 1.5. The I.V. is measured at 25° C. in a 60/40 by weight mixture of phenol/tetrachloroethane at a concentration of 0.5 g/100 ml. Polymers having an I.V. within the range specified above are of sufficiently high molecular weight to be used in the formation of the containers of the present invention.

The polyesters of the present invention are synthesized by methods generally known in the art for producing polyesters. The reactants may all be reacted in a single operation or, alternatively, sequential operation may be employed. Temperatures which are suitable for forming the polyesters generally range between about 180° C. and about 295° C., with the preferred range being about 200° to 285° C. The reaction may be conducted under an inert atmosphere, such as nitrogen. Preferably, the latter stage of the reaction is conducted under a vacuum.

Conventional catalysts are employed in the preparation of the polyester. For example, polymerization can be effected in the presence of catalytic amounts of transition metal compounds, such as antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalysts will be present in an amount of about $10^{-5}$ to $10^{3 \cdot 3}$ moles of catalyst per mole of total acid employed.

Of course, suitable additives, such as dyes, pigments, plasticizers, fillers, antioxidants, stabilizers, etc., may be employed in conventional amounts. Such additives may be added directly to the reaction or may be added to the final polymer.

The polyesters described above may be formed into the containers of the present invention by conventional plastic processing techniques. For example, sheets, films, and other like structures can be formed by well-known extrusion techniques.

Film or sheet material made from the compositions of the present invention is strong, flexible, and clear. It may be formed into articles such as wrappers, bags, and the like.

The polyesters may also be used to form a laminating layer between two or more permeable layers of film. In like manner, a layer of the polyester of the present invention (preferably, a composition containing about 50% of oxydiacetic acid, may be coextruded as a pipe or similar structure between two or more permeable layers. The polyesters may also be used for dip coating containers from a polymer solution in order to improve the barrier properties of a package. In each of these embodiments, the present invention offers the additional advantage of not requiring the use of a tie layer generally when coextruded with compatible materials.

Molded containers can be made from the above-described polyester by compression molding, blow molding, and other such molding techniques, all of which are well known in the art. Preferred molded containers are biaxially oriented blow-molded containers.

The above-described containers of the present invention are ideally suited for protecting comestibles, such as foodstuffs (especially carbonated soft drinks), medicines, and like substances. The advantages of these containers are due to low oxygen and carbon dioxide permeability relative to polyethylene terephthalate. Because of the decreased gas transmission rates of these polyesters, they perform well in packaging applications where improved gas barrier properties are required.

Typically, the containers of the present invention exhibit an oxygen permeability of less than about 8.5 (preferably, less than about 7.5) and a carbon dioxide permeability of less than about 50 (preferably, less than about 30), measured as cubic centimeters permeating a 1 mil thick sample, 100 inches square, for a 24 hour period under a partial pressure difference of 1 atmosphere at 30° C.

This invention will be further illustrated by the following examples, although it will be understood that these examples are included merely for purposes of illustration and are not intended to limit the scope of the invention.

EXAMPLE 1

This example illustrates the improved gas barrier properties of containers formed of naphthalene dicarboxylic acid which has been modified with 5 mole percent of oxydiacetic acid.

A reaction vessel is charged with dimethyl 2,6-naphthalene dicarboxylate, ethylene glycol, 5 mole percent of oxydiacetic acid, based upon the total diacid present, and 100 ppm of titanium from titanium tetraisopropoxide. The reaction mixture is heated and stirred under nitrogen at 200° C. for 60 minutes. The temperature is then increased to 210° C. for 120 minutes until all of the methanol had distilled out of the reaction mixture. The temperature is then raised to 285° C., the nitrogen is removed from the reaction system, and a vacuum is applied. The melt condensation is continued at 285° C. for 45 minutes under 0.5 mm Hg pressure. The heating is discontinued, the reaction mixture is brought to atmospheric pressure with nitrogen, and the polymer is collected.

The oxygen permeability of the polyester is determined in cubic centimeters permeating a 1 mil thick sample, 100 inches square, for a 24-hour period under an oxygen partial pressure difference of one atmosphere at 30° C. using a MOCON Oxtran 100 instrument. The polyester is extruded into amorphous (i.e., unoriented) film using a Brabender extruder at 250°-290° C. The film used to measure permeability is 3-5 mils in thickness, but the permeability was converted to a one mil basis using conventional calculations. In like manner, the carbon dioxide permeability of the polyester is determined using a MOCON Permatran C instrument.

The results are given in Table I.

EXAMPLE 2

Example 1 is repeated except that 10 mole percent of oxydiacetic acid is employed. The oxygen permeability and carbon dioxide permeability of the polyester is determined as in Example 1, and the results given in Table I.

EXAMPLE 3

Example 1 is repeated except that 20 mole percent of oxydiacetic acid is employed.

EXAMPLE 4

Example 1 is repeated except that 50 mole percent of oxydiacetic acid is employed.

EXAMPLE 5

A control sample of polyethylene terephthalate was prepared according to the procedure given in Example 1. The oxygen permeability and carbon dioxide permeability of the sample were determined as in Example 1, and the results are given in Table I.

EXAMPLE 6

Example 1 is repeated except that 2,6-naphthalene dicarboxylic acid is replaced by terephthalic acid. The oxygen permeability of the polyester is determined as in Example 1, and the results are given in Table I.

TABLE I

| Run | Oxygen Permeability | $CO_2$ Permeability |
| --- | --- | --- |
| Ex. 1 | 2.6 | 13 |
| Ex. 2 | 2.3 | 12 |
| Ex. 5 | 10.0 | 59 |
| Ex. 6 | 8.3 | 47 |

An analysis of the data of Table I indicates the superior properties exhibited by the polyesters of the present invention which make them extremely advantageous for use in the formation of containers. It will be noted that the compositions described in the examples, without exception, exhibit oxygen and, for those compositions tested, carbon dioxide permeabilities below those exhibited by polyethylene terephthalate as exemplified by Example 5. The data of Table I further indicate that all the compositions are useful for the formation of improved containers.

The uniqueness of the polyesters of the present invention and of the properties exhibited by containers formed therefrom is indicated by a comparison of the Examples of the present invention which demonstrate a much improved resistance to gas permeability, as compared to polyethylene terephthalate.

While the invention has been described in detail with particular reference to preferred embodiments thereof, it will be understood that variations and modifications can be effected within the spirit and scope of the invention.

We claim:
1. A polyester composition capable of being formed into molded containers having good gas barrier properties comprising the reaction product of
    (A) a diol containing up to about 8 carbon atoms, and
    (B) a diacid component comprising
        (i) about 5 to 95 mole percent of oxydiacetic acid, and,
        (ii) about 5 to about 95 mole percent of naphthalene dicarboxylic acid,
wherein said polyester has an inherent viscosity of about 0.5 to 1.5.

2. The polyester of claim 1 wherein said diol comprises ethylene glycol, 1,4-butanediol, 1,4-cyclohexanedimethanol, or a mixture thereof.

3. The polyester of claim 2 wherein said diol is ethylene glycol.

4. The polyester of claim 1 wherein said oxydiacetic acid is present in a concentration of about 5 to 50 mole percent.

5. A container formed from the polyester of claim 1.

6. A molded container formed from the polyester of claim 1.

7. A blow molded container formed from the polyester of claim 1.

8. A film formed from the polyester of claim 1.

9. A coextruded article comprising the polyester of claim 1.

10. A laminated article comprising the polyester of claim 1.

* * * * *